Figure 1:
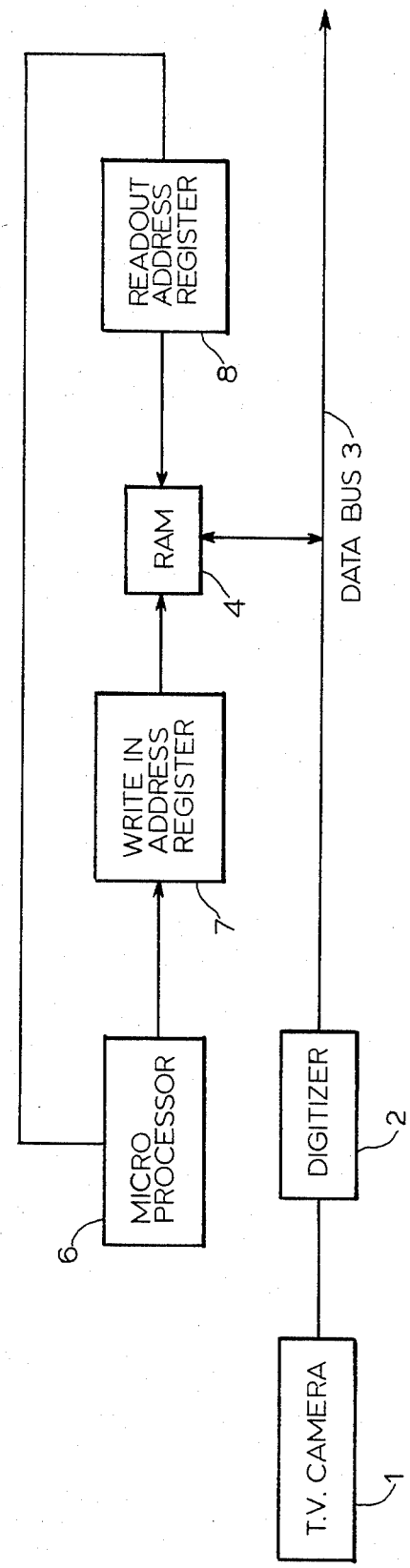

United States Patent [19]

Aufiero et al.

[11] Patent Number: 4,532,546

[45] Date of Patent: Jul. 30, 1985

[54] REAL TIME SINGLE FRAME MEMORY FOR CONVERTING VIDEO INTERLACED FORMATS

[75] Inventors: James M. Aufiero, Reading; William P. D'Agostino, Jr., Bedford; John P. Moore, Arlington, all of Mass.

[73] Assignee: Itek Corporation, Lexington, Mass.

[21] Appl. No.: 568,168

[22] Filed: Jan. 4, 1984

[51] Int. Cl.³ .............................................. H04N 5/32
[52] U.S. Cl. ..................................... 358/111; 358/140
[58] Field of Search ........................... 358/11, 140, 111

[56] References Cited

U.S. PATENT DOCUMENTS 4,057,835 11/1977 Kinukata et al. ................... 358/140

*Primary Examiner*—Howard W. Britton
*Assistant Examiner*—Victor R. Kostak
*Attorney, Agent, or Firm*—Michael H. Wallach; Robert F. Rotella

[57] ABSTRACT

Circuitry for converting interlaced video data to non-interlaced video data at 30 frames per second, real time video rate, where rows of successive lines of video data applied to a single frame memory are provided having data control means including readin and readout means for initially sequentially loading each row of memory with lines of interlaced video data of the first frame sequentially applied to the memory and thereafter reading out successive memory rows of the first frame from memory, while replacing each line readout by whatever line of the second frame is applied to memory in real time just after readout, until all lines of data of the second frame are inserted into memory. Successive frames are read out using a row addressing increment of N/2 for the next frame and repeating similar reading and readout of subsequent frames while multiplying the denominator of the address incrementing factor by two for each subsequent frame until the factor would be less than unity, and thereafter increasing the factor back to N/2 to repeat the cycle to process subsequent frames.

16 Claims, 5 Drawing Figures

| MEMORY LINE Y ADDRESS | F-1 | F-2 | F-3 | F-4 |
|---|---|---|---|---|
| 0 | 0 | 0 | 0 | 0 |
| 1 | 2 | 4 | 1 | 2 |
| 2 | 4 | 1 | 2 | 4 |
| 3 | 6 | 5 | 3 | 6 |
| 4 | 1 | 2 | 4 | 1 |
| 5 | 3 | 6 | 5 | 3 |
| 6 | 5 | 3 | 6 | 5 |
| 7 | 7 | 7 | 7 | 7 |

*FIG. 2.*

REAL TIME SINGLE FRAME MEMORY FOR CONVERTING VIDEO INTERLACED FORMATS

BACKGROUND OF THE INVENTION

A video frame is frequently transmitted in an interlaced format, where the first line zero and each subsequent even-numbered line are sent first, covering every other line of the screen from the top down, and then line "one" and each subsequent odd-numbered line are sent, to fill in the gaps in the screen, again from the top down. This maintains a transmission time which is below the threshold for perceiving a flicker on the screen.

The assignee of the present invention developed a digital X-ray image processing system which digitizes successive frames of video data representing X-ray images, and manipulates data representative of the images for various purposes such as image enhancement, incremental subtraction, display buffering and the like. After the digital data has been processed, it is employed to control a CRT readout console which displays the visually enhanced digital X-ray images for diagnostic purposes. Interlace video data generated by the T.V. camera is converted to a non-interlace, i.e., a sequential format where the lines are in order, format before the data processing is carried out. After insertion of the digitized frame into a first digital storage device, the lines could be rearranged by inserting them in the proper order into a second storage device, which would contain the non-interlaced frame image. However, it is deemed desirable to eliminate the use of more than one frame memory, and yet provide real time conversion from the interlace to the non-interlace format. This objective is attained in accordance with the present invention by taking advantage of the fact that the number of lines per frame are generally an integral power of 2.

SUMMARY OF THE INVENTION

In accordance with a preferred embodiment of the invention, the lines of video data, after insertion into the single frame memory, are readout by reading out the first line readin and thereafter stepping an address means by an increment of N/2, where N is the number of lines of the frame, to readout the next line. After the readout of each line of the first frame, the line of the second frame present at the input of the single frame memory data bus is inserted into the memory row which contained the line just readout. After the completion of the reading out of the lines of the first frame, the lines of the second frame now within the single frame memory are readout in like manner, except that the readout increment of the second frame from one row readout to the next row readout, is reduced by half relative to the readout increment of the first frame i.e. to N/4, and the readin of each line of the third frame is performed in real time after the readout of each line of the second frame. This continues until the divisor equals N making the readout interval one. After the readout interval of one is employed, the next increment is increased to the starting point where the number of lines is N divided by 2 and the process repeats. As a result of this procedure, each frame is readout of a single frame memory in non-interlace format, without the need for additional storage.

Figure 3:
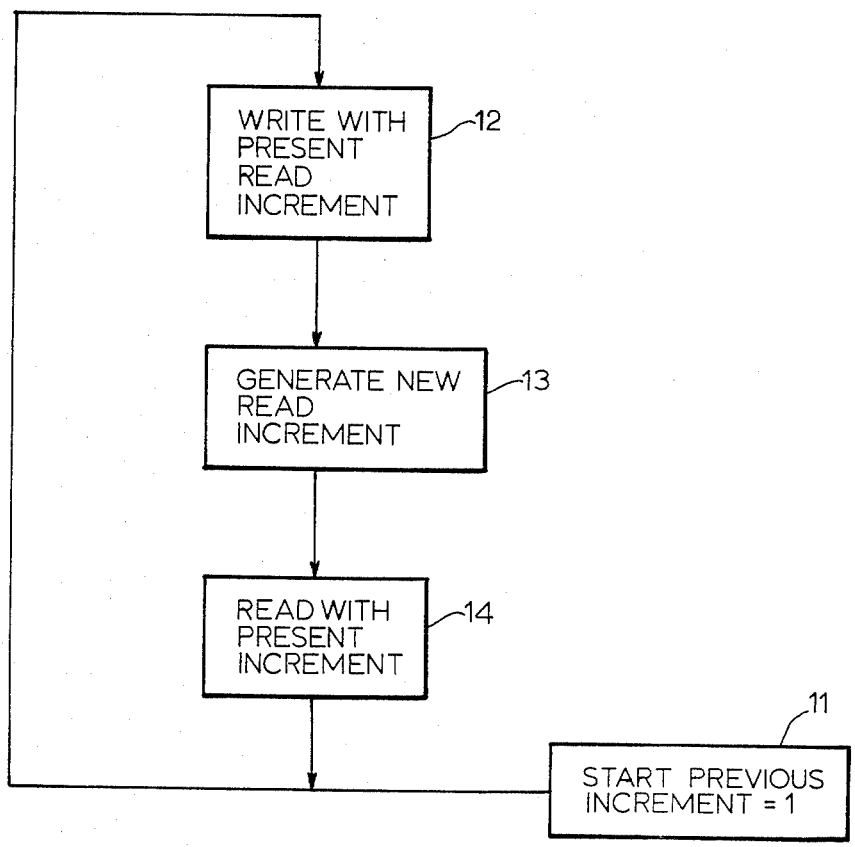
Figure 4:
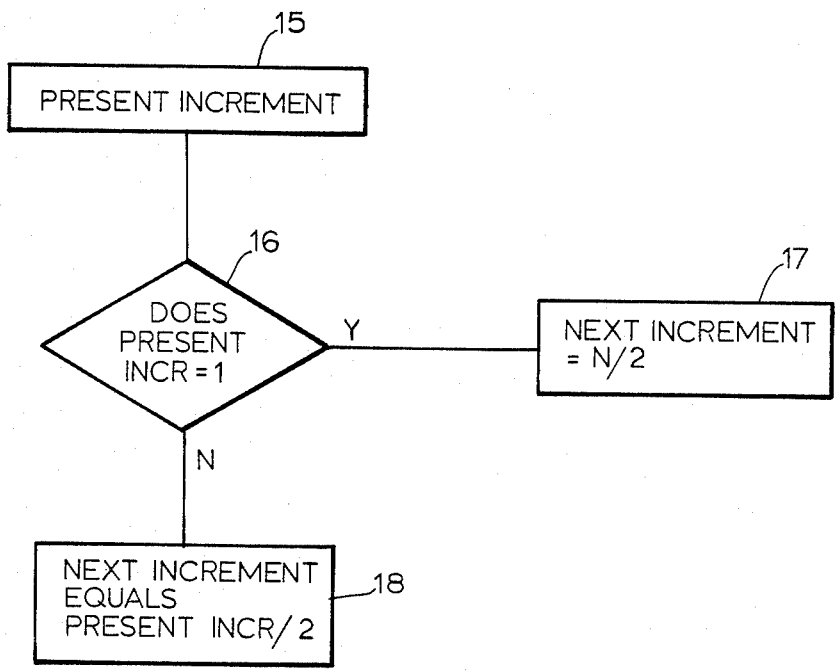
Figure 5:
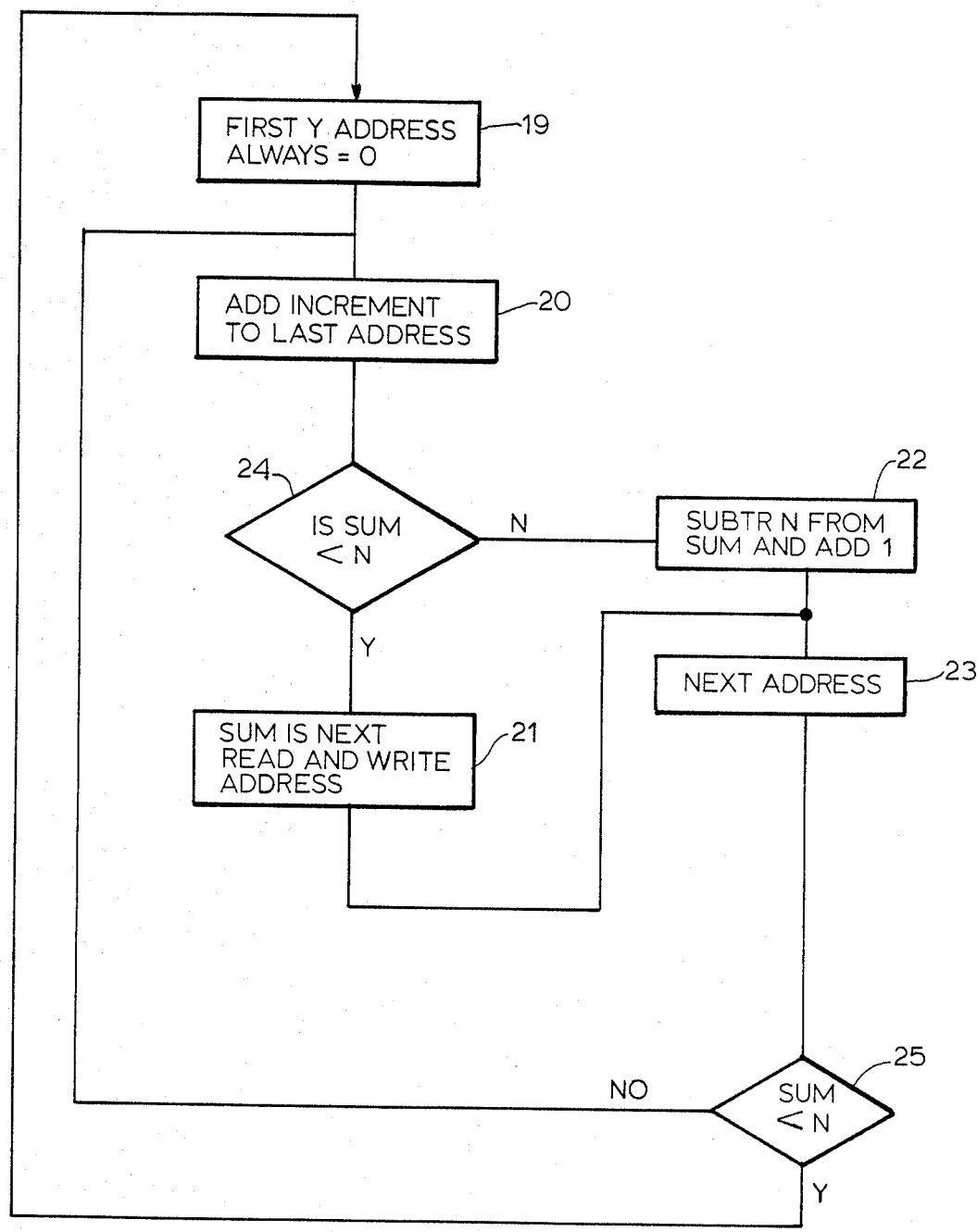

Other objects, features and advantages of the present invention will become apparent upon the study of the following detailed description, taken in conjunction with the drawings in which:

FIG. 1 schematically illustrates the circuitry of one embodiment;

FIG. 2 is a table illustrating the contents of the single frame memory at various times; and FIGS. 3-5 are flow charts which will aid the reader in understanding the invention.

SPECIFIC DESCRIPTION

Referring now to FIG. 1, T.V. camera 1 is coupled to digitizer 2, which converts the analog signals generated by the conventional line interlaced camera, into binary words. For more details of a system in which the present invention is used see application Ser. No. 06/568,013 entitled "Real Time Digital Diagnostic Image Processing System" filed on evendate herewith and assigned to the same assignee as the present invention. The ten bit binary words, each word representing a pixel, are impressed upon data bus 3 which is coupled to the single frame random access buffer memory 4, as illustrated. The manner in which data is read in and out of this memory is described in detail in copending application Ser. No. 06/568,025 entitled Digital Frame Processor Pipeline Circuit filed on even date herewith and assigned to the same assignee as the present invention. The interlaced image is thus inserted into the single frame memory and is thereafter converted in accordance with the present invention to the non-interlaced format, which is transmitted via data bus 3 to other data processing circuitry within the digital image processing system, which is not of concern with respect to understanding the present invention. The lines of video data relating to the first frame, are read in to frame memory 4 under the control of write address register 7, which is controlled by microprocessor 6. The read address register 8, thereafter causes the binary words representing the first frame to be readout of frame memory 4, in accordance with the present invention to be described.

While the invention is presently employed in connection with the conversion of a substantial number of lines of video data, i.e. 512, it is believed that the invention may be more easily grasped by first describing the specific example of an eight line video frame. Following the example, the procedure will be described with reference to flow charts, for the general case.

The table of FIG. 2 includes the memory row line address set forth in the left hand column of the table, the remaining columns illustrating those video lines which occupy each row of the single frame memory at various times during processing of the data. The numbered video lines 0, 2, 4 and 6 of the first eight line frame are inserted into the first 4 rows of the frame memory as they are sequentially applied to the memory by the digitizer. Lines 1, 3, 5 and 7 of the first frame are thereafter inserted into memory lines or rows 4, 5, 6 and 7, so that the first video frame becomes initially inserted into the single frame memory in interlaced fashion. The straightforward row by row reading out of the video lines from memory would generate two images, one above the other. However, as the second frame video lines are sequentially applied to the memory in real time, in the sequence of 0, 2, 4, 6, 1, 3, 5 and 7, the video lines of the first frame are readout in real time, and in accordance with the invention, will be readout in the non-interlaced format. The 0 video line of frame 1 is first readout, and the 0 line of the second frame is readin, just after readout, and the readout counter in micro processor 6 is thereafter incremented by N/2 where N is the number of lines in a frame, in this particular example by 4 (8/2), so that the next video line, namely line 1, occupying memory address line 4, is thereafter readout. Just after readout, the next video line of frame 2, namely video line 2, is inserted into memory line address 4 to replace video line 1 just readout. This is illustrated in the F-2 column whereby the number 2 is inserted in row 4 of the table to indicate that the fourth memory line address now contains video line 2 instead of video line 1 which has just been readout. As mentioned above, the readout counter increment for the first frame is the number of lines N per frame (eight in this example), divided by 2. Thus, with respect to the readout of the first frame stored in memory, the increment of 4 is added to memory line address 0 to thereby readout the video line 1 occupying the fourth row of memory as just mentioned. During the readout of frame 1 the increment 4 will continually be employed. Stepping from row 4 by an increment of 4 would take us "off the screen" and thus 8 which is the number of lines N of the frame being processed in the example, is subtracted from "imaginary" row 8 and a 1 is added, so that the readout counter is now incremented to memory address 1 where readout line 2 is stored within the memory. Line 2 is readout, and the next line of the second frame applied in real time to the memory, namely line 4, is substituted in memory row 1 as indicated in the F2 column. The readout counter is again incremented by 4, so that the third video line is now readout of row 5 and the sixth video line of the second frame applied in real time to memory is substituted therefore as indicated under the F2 column. Again, incrementing forward by four takes us off of the screen at "imaginary" line 9 whereby we subtract 8 and add 1, so that line 4 occupying memory row address 2 is thereafter readout, and line 1 of frame 2 is thereafter inserted into row 2, and the readout counter is then incremented by 4, to thereby readout video line 5 of frame 1 in row 6 and video line 3 of frame 2 is substituted as indicated by the F2 column. In like manner, video line 6 in memory row 3 is readout, and line 5 of frame 2, applied to the memory in real time, is substituted for line 6 and now occupies line memory 3. The counter is again incremented by 4 and the 7th video line of the first frame is readout and replaced by the 7th video line of frame 2 as shown in the F2 column, and the readout of frame 1 has now been completed. It may be noted that the lines of frame 1 have been readout sequentially from 0 through 7, and they have thus been converted to a non-interlaced, i.e., sequential format.

It may also be noted that the video lines now stored in the single frame memory makeup four quarter resolution images rather than two as was previously the case. However, in accordance with the invention, the lines will continue to be readout in non-interlaced fashion. As before, the video line 0 of frame 2 now occupying the first memory line address or row 0, is readout, and the 0 line of frame 3 is substituted therefore. However, the denominator of the incrementing factor, (4 during frame 1 readout) will be multiplied by 2 during the readout of the second frame, so that the readout counter will be incremented by 2 (8/4) rather than 4 (8/2) as was previously the case in connection with the reading out of frame 1. Thus, just after the readout of video line 0 of the second frame, video line 0 of the third frame will be inserted into line address 0, and the readout counter will then be incremented by 2, rather than 4, so that line 1 occupying memory row or line address 2 is thereafter readout and the second video line of frame 3 applied in real time to the memory, will be substituted therefore as indicated in the F-3 column. The counter is now stepped by 2 to readout video line 2 occupying line address 4 and video line 4 of frame 3 applied in real time is substituted therefore. Video line 3 in memory line address 6 is now readout and the sixth video line of frame 3 is substituted therefore.

It may be noted, that the frame 2 video lines will be readout, as in the case of the readout of frame 1, in non-interlaced fashion, that is we have readout successively lines 0, 1, 2 and 3. Since incrementing from memory line address 6 will take us "off the screen" at imaginary line address 8, 8 steps are subtracted and 1 step is added as before, so that the readout counter now points to memory line address 1 and video line 4 of frame 2 is readout and line 1 of frame 3 applied to the memory in real time is substituted therefore. Incrementing two steps forward results in of the readout of video line 5 and incrementing 2 steps thereafter results in the readout of video line 6 and video line 7, so that the video lines of frame 2 stored in the single frame memory have been converted to non-interlaced format just as was the case in the readout of the video lines of frame 1. Lines 3, 5, and 7 of frame 3 are of course readin. It is interesting to note that the frame 3 contents of the single frame memory, now are arranged in numerical order. The denominator of incrementing factor is again multiplied by 2, so that incrementing by 1 (8/8) is performed in connection with the readout of the video lines of frame 3 contained within the store. As a result, lines 0, 1, 2, etc. are sequentially readout and are also in non-interlaced format. During the sequential readout of the video lines of frame 3 the interlaced lines of frame 4 are being applied in real time so that the video lines of the fourth frame will be substituted as indicated in the F-4 column, and it may be noted that the order of these lines are the same as the order of lines originally inserted into the store under the F1 column, and the cycle has been restarted. The lines of frame 4 are readout by incrementing the readout by 4 as was the case previously described in connection with the readout of the frame 1 lines. This is because multiplying the denominator (1) by 2 would result in the incrementing factor being less than unity (8/16) which requires, in accordance with the invention, that the new factor commence at the number of frame lines divided by 2. The cycle is repeated over and over the process subsequent frames in real time.

FIGS. 3, 4 and 5 are flow diagrams of the process carried out in microprocessor 6 to implement the present invention. In FIG. 3 the process is initiated by establishing an increment which is 1 during the loading of the frame memory by lines of the first frame. The new increment for reading out the lines in memory is generated and the lines are readout of the frame memory in accordance with the resulting increment which in the prior case was 4, and which is described as the present increment. Just after each line is readout from memory the succeeding lines of frame 2 are written in in the same storage space occupied by the line just readout so that the write increment is the same as the read increment in accordance with the invention. In the startup condition whereby the first frame video lines are inserted into the memory the increment is always 1 as indicated by block 11 of FIG. 3. Thus, writing into the memory as called for by block 12 is done with an increment of 1. The program now proceeds to block 13 where a new increment is to be generated.

FIG. 4 schematically illustrates the generation of the new read increment represented by block 13 in FIG. 3. The present increment in block 15 is tested in decision block 16 to see if it is equal to one. Since it is in this case, block 17 is entered. The next increment would therefore be the number of frame lines N divided by 2 (block 17). In the previous example of 8 lines, this was 4. In the case of 512 lines the next increment becomes 256 and the first frame is readout of the memory with a read increment equal to 256 as indicated by block 14 of FIG. 3. The lines of the second frame are readin to memory in accordance with the readin increment which is also 256 i.e. the lines of the next frame are readin into storage cells just depleted in accordance with the readout of prior frame lines as indicated by block 12 of FIG. 3. For generating the next increment as required by block 13 the present increment, (256) or block 15 of FIG. 4 is greater than one, when tested in block 16. Thus it is divided by two (block 18) to generate the next increment of 128, and so forth. Thus FIG. 4 schematically illustrates the frame level procedure for changing increments from one frame to the next. When the present increment returns to 1 again, block 17 is entered and the process repeats.

In FIG. 5, a flowchart for the generation of the proper y address values within each frame is illustrated. As described in connection with the specific example, the first y address is always memory line address 0. This is indicated by block 19. The frame 1 readout increment generated in accordance with FIG. 3 is now used to generate the next address in block 10. The present increment is added to the last address (block 20). If the sum is less than N, as tested in decision block 24 the resulting sum will be the next read and write address indicated by block 21. In the case of the specific example, given above, 4 was added to memory line address 0, thereby to readout the line 4 address. If the sum is greater than the number of lines, N is subtracted from the resulting sum and 1 is added to obtain the next address as indicated by block 22. In the specific example, the addition of 4 (N/2) to the line address 4 resulted in the off screen sum of "line 8", and 8 was subtracted and a 1 was added to thereby readout the contents of memory line address 1 as described earlier. The procedure outlined in FIG. 5 is employed for determining both the reading and the writing addresses.

A further test is done in block 25 to check for the end of the frame. If not at the end of the frame, the program loops back to block 20. When the frame ends, the program goes back to block 19 for the first address of the next frame.

Thus, counting starts with memory line address 0 and preceedes to N-1 since the first line is designated 0. However N equals two to the k power where k is an integer. In the case of the specific example, N equals 8 and k would thus equal 3 and thus the entire process repeats after three (k) frames as illustrated in FIG. 2. It should be noted that numbers in the frame 4 column are equal to the numbers in the frame 1 column indicating the completion of the cycle. In the 512 video line frame case, the cycle would repeat after 9 frames rather than after 3 frames; in other words after 9 frames which is the base 2 logarithm of the number of lines, the procedure has reverted to the beginning of the next cycle.

The data processing described above may be implemented by either by hardware or by software, as is obvious to the skilled worker in the art. In the digital X-ray system described in the aforementioned co-pending applications, the data processing described above is implemented by software.

While particular embodiments of the present invention have been shown and described, it is apparent that various changes and modifications may be made, and it is therefore intended that the following claims cover all such modifications and changes as may fall within the true spirit and scope of this invention.

We claim:

1. Circuitry for converting in real time, from an interlaced to a non-interlaced format, successive frames of video data supplied to a single frame memory comprising:

A. data control means including memory writein and readout address means for:

a-1: initially sequentially addressing portions of said memory to cause loading of memory portions of said memory with lines of interlaced video data of a first frame sequentially applied to said memory;

a-2: thereafter sequentially addressing said memory to cause reading out of lines from successive memory portions of said memory by incrementing said readout means by an incrementing factor of N/2, where N is the number of lines in each frame, while replacing each line readout by whatever line of a second frame is applied to said memory in real time just after readout, until all lines of data of said second frame are inserted into said memory;

a-3: thereafter incrementing said readout means by an incrementing factor of N/4 and sequentially reading out each line of said second frame from said memory while replacing each line readout by whatever line of a third frame is applied to said memory in real time just after readout, until all lines of data of said third frame are inserted into said memory;

a-4: reading out and replacing data of subsequent frames in like manner while multiplying the denominator of said incrementing factor by two for each subsequent frame readout until said factor would be less than unity and thereafter;

a-5: increasing said incrementing factor back to N/2, and thereafter repeating steps a-2, a-3, and a-4 to readout and replace data of subsequent frames.

2. The combination as set forth in claim 1 wherein said data control means includes means for reading out of said single frame memory the first line of each frame read therein, before the successive incremental readout of said memory portions by said readout means.

3. The combination as set forth in claim 1 wherein said single frame memory comprises a RAM.

4. The combination as set forth in claim 2 wherein said single frame memory comprises a RAM.

5. In a digital X-ray image processing system:

a. a T.V. camera for generating analog signals representative of an X-ray image;

b. a digitizer for converting said analog signals into binary words, each word representative of a pixel of the image scanned by said T.V. camera, the output of said digitizer constituting digitized lines of first, second, third and subsequent successive frames of video data generated by said T.V. camera;

c. a single frame memory coupled to said digitizer for storing said digitized lines in portions of storage elements therein;

d. data control means including memory write in and readout means for:

d-1: initially sequentially loading portions of said memory with lines of interlaced digital video data of a first frame sequentially applied to said memory;

d-2: thereafter reading out lines within successive memory portions of said memory by incrementing said readout means by an incrementing factor of N/2, where N is the number of lines in each frame, while replacing each line readout by whatever line of said second frame is applied to said memory in real time just after readout, until all lines of data of said second frame are inserted into said memory;

d-3: thereafter incrementing said readout means by an incrementing factor of N/4 and reading out each line of said second frame from said memory while replacing each line readout by whatever line of said third frame is applied to said memory in real time just after readout, until all lines of data of said third frame are inserted into said memory;

d-4: reading out and replacing data of subsequent frames in like manner while multiplying the denominator of said incrementing factor by two for each subsequent frame readout until said factor would be less than unity and thereafter; d-5 increasing said incrementing factor back to N/2, and thereafter repeating steps d-2, d-3, and d-4 to readout and replace data of subsequent frames.

6. The combination as set forth in claim 5 wherein said data control means includes means for reading out of said single frame memory the first line of each frame read therein, before the successive incremental readout of said memory portions by said readout means.

7. The combination as set forth in claim 5 wherein said single frame memory comprises a RAM.

8. The combination as set forth in claim 6 wherein said single frame memory comprises a RAM.

9. Circuitry for converting in real time interlaced to non-interlaced format lines of first, second, third and subsequent frames of digitized video data supplied to a single frame memory comprising:

A. data control means including memory writein and readout means for:

a-1: initially loading portions of said memory with lines of interlaced video data of a first frame applied to said memory;

a-2: thereafter reading out lines from successive memory portions of said memory by incrementing said readout means by an incrementing factor of N/2, where N is the number of lines in each frame, while replacing each line readout by whatever line of said second frame is applied to said memory in real time just after readout, until all lines of data of said second frame are inserted into said memory;

a-3: thereafter incrementing said readout means by an incrementing factor of N/4 and reading out each line of said second frame from said memory while replacing each line readout by whatever line of said third frame is applied to said memory in real time just after readout, until all lines of data of said third frame are inserted into said memory;

a-4: reading out and replacing data of subsequent frames in like manner while multiplying the denominator of said incrementing factor by two for each subsequent frame readout until said factor is less than unity and thereafter;

a-5: increasing said incrementing factor back to N/2, and thereafter repeating steps a-2, a-3, and a-4 to readout and replace data of subsequent frames.

10. The combination as set forth in claim 9 wherein said data control means includes means for reading out of said single frame memory the first line of each frame written therein, before the successive incremental readout of said memory portions by said readout means.

11. The combination as set forth in claim 9 wherein said single frame memory comprises a RAM.

12. The combination as set forth in claim 10 wherein said single frame memory comprises a RAM.

13. Method of converting in real time interlaced to non-interlaced format lines of first, second, third and subsequent frames of video data fed into and out of a single frame memory by writein and readout means associated therewith, including the steps of:

A. initially loading said memory in sequence with lines of interlaced video data of a first frame applied to said memory;

B. thereafter reading out lines from successive memory portions of said first frame from said memory by incrementing said readout means by an incrementing factor of N/2, where N is the number of lines in each frame, while replacing each line readout by whatever line of said second frame is applied to said memory in real time just after readout, until all lines of data of said second frame are inserted into said memory;

C. thereafter incrementing said readout means by an incrementing factor of N/4 and reading out each line of said second frame from said memory while replacing each line readout by whatever line of said third frame is applied to said memory in real time just after readout, until all lines of data of said third frame are inserted into said memory;

D. reading out and replacing data of subsequent frames in like manner while multiplying the denominator of said incrementing factor by two for each subsequent frame readout until said factor would be less than unity and thereafter;

E. increasing said incrementing factor back to N/2, and thereafter repeating steps B, C and D to readout and replace data of subsequent frames.

14. The method of claim 13 wherein the first line of each frame written into said memory is readout before incrementing in accordance with steps B-D.

15. The method of claim 13 wherein said lines are loaded and readout from memory sequentially.

16. The method of claim 14 wherein said lines are loaded and readout from memory sequentially.

* * * * *